US012689887B2

(12) United States Patent
Eldar

(10) Patent No.: US 12,689,887 B2
(45) Date of Patent: Jul. 21, 2026

(54) CELLULAR NETWORK CONTEXT BASED QUERY SYSTEMS AND METHODS

(71) Applicant: Boost SubscriberCo L.L.C., Englewood, CO (US)

(72) Inventor: Eran Eldar, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 315 days.

(21) Appl. No.: 18/499,619

(22) Filed: Nov. 1, 2023

(65) Prior Publication Data

US 2025/0142318 A1     May 1, 2025

(51) Int. Cl.
*H04W 8/20* (2009.01)
*H04W 8/26* (2009.01)

(52) U.S. Cl.
CPC .............. *H04W 8/20* (2013.01); *H04W 8/26* (2013.01)

(58) Field of Classification Search
CPC ................................... H04W 8/20; H04W 8/26
See application file for complete search history.

(56) References Cited

U.S. PATENT DOCUMENTS

| | | | | |
|---|---|---|---|---|
| 8,977,263 B2 * | 3/2015 | Chin | ..................... | H04W 48/18 |
| | | | | 455/435.3 |
| 2002/0123919 A1 * | 9/2002 | Brockman | ............. | G06Q 30/02 |
| | | | | 379/112.06 |

| | | | | |
|---|---|---|---|---|
| 2011/0143753 A1 * | 6/2011 | Rahman | ................ | H04W 48/16 |
| | | | | 455/432.1 |
| 2017/0223717 A1 * | 8/2017 | Athani | ............... | H04B 7/15507 |
| 2018/0255061 A1 * | 9/2018 | Sikri | ....................... | H04L 63/205 |
| 2021/0392556 A1 * | 12/2021 | Soma | .................. | H04W 36/302 |
| 2023/0208727 A1 * | 6/2023 | Trivedi | ................... | H04L 41/22 |
| | | | | 715/735 |
| 2023/0291676 A1 * | 9/2023 | Lagerholm | ............. | H04L 43/50 |
| 2023/0308355 A1 * | 9/2023 | Singh | .................... | H04W 16/18 |
| 2024/0338260 A1 * | 10/2024 | McSweeney | ....... | G06F 11/0772 |
| 2024/0362345 A1 * | 10/2024 | Babani | .................. | G06F 21/604 |
| 2025/0016262 A1 * | 1/2025 | Spindler | .............. | H04W 12/06 |
| 2025/0110919 A1 * | 4/2025 | Vasudeva | .............. | G06F 16/116 |

* cited by examiner

*Primary Examiner* — Santiago Garcia
(74) *Attorney, Agent, or Firm* — Kilpatrick Townsend & Stockton LLP

(57) ABSTRACT

A system may perform operations to receive an input via a graphical user interface (GUI) corresponding to a request for first cellular network data. The input may include a first cellular network identifier (CNI). The system may receive a selection of a cellular network management system (CNMS) via the GUI. The system may transmit the request for the first cellular network data to the selected CNMS via a first application programming interface (API). The system may receive, via the first API, the first cellular network data including a second CNI. The system may display a first view of the first cellular network data and a graphical element configured to cause the cellular network system to display a second view of the first cellular network data. A context view representing a context may be displayed within the GUI. The context of the request to be used in subsequent requests.

17 Claims, 9 Drawing Sheets

300

| | |
|---|---|
| Receive a first input | 302 |

↓

| | |
|---|---|
| Receive a selection of a cellular network management system | 304 |

↓

| | |
|---|---|
| Transmit the request | 306 |

↓

| | |
|---|---|
| Receive the first cellular network data | 308 |

↓

| | |
|---|---|
| Storing the first cellular network data | 310 |

↓

| | |
|---|---|
| Cause a first view of the first cellular network data to be displayed | 312 |

↓

| | |
|---|---|
| Cause a context view to be displayed such that the context is used in subsequent requests | 314 |

CELLULAR NETWORK CONTEXT BASED QUERY SYSTEMS AND METHODS

BACKGROUND

Issues experienced by users of a wireless network, such as a cellular network, may be complex and involve multiple systems. Finding the root cause of some or all of these issues may require significant time to locate by accessing several systems. Many of these systems may include different references and identifiers, adding complexity and time to finding a resolution to the problem. Therefore, there is a need to more efficiently find the cause of and solution to problems faced by users of a wireless network.

BRIEF SUMMARY

A method of communicating with a cellular network management system may include receiving, by a cellular network system, a first input via a graphical user interface (GUI) corresponding to a request for first cellular network data. The first input may include a first cellular network identifier mapped to a user. The method may include receiving, by the cellular network system, a selection of a cellular network management system from a plurality of cellular network management systems that are individually accessible via the GUI. The method may include transmitting, by the cellular network system, the request for the first cellular network data to the selected cellular network management system via a first application programming interface (API), the first API selected from a plurality of APIs based on the selected cellular network management system. The method may include receiving, by the cellular network system and from the selected cellular network management system via the first API, the first cellular network data including a second cellular network identifier mapped to the user. The method may include storing, by the cellular network system, the first cellular network data, the first cellular network identifier, and the second cellular network identifier. The method may include causing, by the cellular network system, a first view of the first cellular network data and a graphical element associated with the first cellular network data to be displayed, where the graphical element associated with the first cellular network data is configured to cause the cellular network system to display a second view of the first cellular network data. The method may include causing, by the cellular network system, a context view representing a context of the request to be displayed within the GUI, the context view may include the first cellular network identifier and the second cellular network identifier, and the context of the request to be used in subsequent requests.

In some embodiments, the method may also include receiving, by the cellular network system, a selection of a second cellular network management system from the plurality of cellular network management systems that are individually accessible via the GUI. The method may also include transmitting, by the cellular network system, a second request for second cellular network data to the second selected cellular network management system via a second API, the second request based on at least one of the first cellular network identifier and the second cellular network identifier. The second API may be selected from the plurality of APIs based on the second selected cellular network management system. The method may also include receiving, by the cellular network system and from the cellular network management system via the second API, the second cellular network data may include a third cellular network identifier mapped to the user. The method may also include storing, by the cellular network system, the second cellular network data and the third cellular network identifier. The method may also include causing, by the cellular network system, a first view of the second cellular network data and a graphical element associated with the second cellular network data to be displayed, where the graphical element associated with the second cellular network data is configured to cause the cellular network system to display a second view of the second cellular network data. The method may also include updating, by the cellular network system and in the GUI, the context view to may include the third cellular network identifier.

In some embodiments, the cellular network system causes the first cellular network identifier to be displayed in the context view in response to the first input and updates the context view to include the second cellular network identifier based on the first cellular network data. The first API may query a database containing cellular network data indicating one or more user devices associated with the user. The first API may access a historical database including cellular network data relating to one or more transactions associated with the user. The first API may access a database including cellular network information indicating one or more events associated with the user. The first API may access one or more account identifiers associated with the user. The first API may access cellular network billing information associated with the user.

A system for retrieving data from a cellular network management system may include one or more processors and a non-transitory computer-readable medium including instructions. When executed by the one or more processors, the instructions may cause the system to perform operations to receive a first input via a graphical user interface (GUI) corresponding to a request for first cellular network data. The first input may include a first cellular network identifier mapped to a user. The system may receive a selection of a cellular network management system from a plurality of cellular network management systems that are individually accessible via the GUI. The system may transmit the request for the first cellular network data to the selected cellular network management system via a first application programming interface (API), the first API selected from a plurality of APIs based on the selected cellular network management system. The system may receive from the selected cellular network management system via the first API, the first cellular network data including a second cellular network identifier mapped to the user. The system may store the first cellular network data, the first cellular network identifier, and the second cellular network identifier. The system may cause a first view of the first cellular network data and a graphical element associated with the first cellular network data to be displayed, where the graphical element associated with the first cellular network data is configured to cause the cellular network system to display a second view of the first cellular network data. The system may cause a context view representing a context of the request to be displayed within the GUI. The context view may include the first cellular network identifier and the second cellular network identifier, and the context of the request to be used in subsequent requests.

In some embodiments, the instructions may further cause the system to perform operations to receive a selection of a second cellular network management system from the plurality of cellular network management systems that are individually accessible via the GUI. The system may transmit a second request for second cellular network data to the second selected cellular network management system via a second API, the second request based on at least one of the first cellular network identifier and the second cellular network identifier, the second API selected from the plurality of APIs based on the second selected cellular network management system. The system may receive, from the cellular network management application via the second API, the second cellular network data may include a third cellular network identifier mapped to the user. The system may store the second cellular network data and the third cellular network identifier. The system may cause a first view of the second cellular network data and a graphical element associated with the second cellular network data to be displayed, where the graphical element associated with the second cellular network data is configured to cause the cellular network system to display a second view of the second cellular network data. The system may update, in the GUI, the context view to may include the third cellular network identifier.

In some embodiments, the first API and the selected cellular network management system may be a component of a wireless network provider. The wireless network provider may be a 5G cellular network provider. The system may cause the first cellular network identifier to be displayed in the context view in response to the first input and update the context view to include the second cellular network identifier based on the first cellular network data. The graphical element associated with the first cellular network data may cause the system to access and display the cellular network data received from the respective application programming interface in an application outside of the GUI.

A non-transitory computer-readable medium may include instructions that when executed by one or more processors, cause the one or more processors to perform operations. The operations may include receiving, by a cellular network system, a first input via a graphical user interface (GUI) corresponding to a request for first cellular network data. The first input may include a first cellular network identifier mapped to a user. The operations may include receiving, by the cellular network system, a selection of a cellular network management system from a plurality of cellular network management systems that are individually accessible via the GUI. The operations may include transmitting, by the cellular network system, the request for the first cellular network data to the selected cellular network management system via a first application programming interface (API), the first API selected from a plurality of APIs based on the selected cellular network management system. The operations may include receiving, by the cellular network system and from the selected cellular network management system via the first API, the first cellular network data including a second cellular network identifier mapped to the user. The operations may include storing, by the cellular network system, the first cellular network data, the first cellular network identifier, and the second cellular network identifier. The operations may include causing, by the cellular network system, a first view of the first cellular network data and a graphical element associated with the first cellular network data to be displayed, where the graphical element associated with the first cellular network data is configured to cause the cellular network system to display a second view of the first cellular network data. The operations may include causing, by the cellular network system, a context view representing a context of the request to be displayed within the GUI, the context view may include the first cellular network identifier and the second cellular network identifier, and the context of the request to be used in subsequent requests.

In some embodiments, the operations may also include receiving, by the cellular network system, a selection of a second cellular network management system from the plurality of cellular network management systems that are individually accessible via the GUI. The operations may also include transmitting, by the cellular network system, a second request for second cellular network data to the second selected cellular network management system via a second API, the second request based on at least one of the first cellular network identifier and the second cellular network identifier. The second API may be selected from the plurality of APIs based on the second selected cellular network management system. The operations may also include receiving, by the cellular network system and from the cellular network management system via the second API, the second cellular network data may include a third cellular network identifier mapped to the user. The operations may also include storing, by the cellular network system, the second cellular network data and the third cellular network identifier. The operations may also include causing, by the cellular network system, a first view of the second cellular network data and a graphical element associated with the second cellular network data to be displayed, where the graphical element associated with the second cellular network data is configured to cause the cellular network system to display a second view of the second cellular network data. The operations may also include updating, by the cellular network system and in the GUI, the context view to may include the third cellular network identifier.

In some embodiments, a third display window may include an error message associated with a failed API call. The first API and the selected cellular network management system may be a component of a wireless network provider.

DETAILED DESCRIPTION

Figure 1:
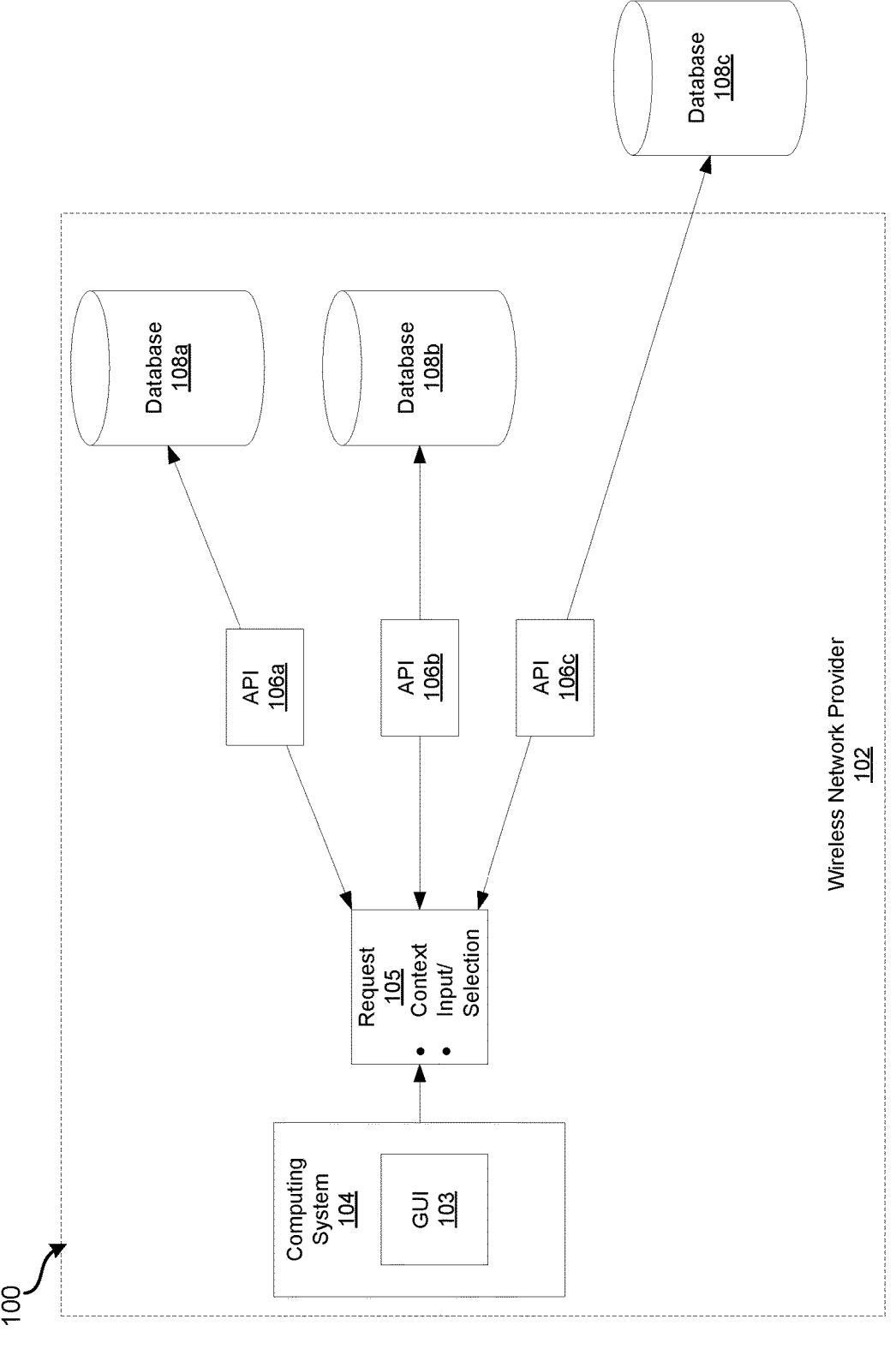
FIG. 1 illustrates a system for resolving problems experienced by a user associated with a wireless network provider, according to certain embodiments.

As the services offered by service providers become more extensive and complex, the issues that arise also become more complex. Furthermore, the systems required to manage such services also become more complex, both in operation and in the number of systems needed to administer the system. This added complexity may be evident when a user experiences a problem with a service and attempts to have the problem remedied.

For example, acquiring a user equipment (UE) such as a mobile device may require many more steps than would be obvious at first glance. A UE bought in a store may have several transactions, between the user and the store, between the store and a wireless network provider, between the user and the wireless network provider, etc. Each step in the transaction may further include several intermediate steps, performed by a person and/or by one or more computing systems. Thus, identifying an error in even a relatively simple transaction may include several parties, several systems, and several steps, requiring careful attention and tracking of each system in the chain in order to eventually identify the problem. Other transactions, such as porting-in a UE from a second wireless network provider may add yet other levels complexity. Accounts that have multiple UE's associated with the user may add still more levels of complexity.

Many of the problems that may be experienced by the user may be unrelated to a transaction. Other problems may include network authentication issues with a cellular network, equipment registration, billing issues, and any other such issues. The result, no matter the problem, may be the user's lack of wireless service (or other such results). Because the systems involved are dispersed and complex, it may therefore take time to identify the systems associated with the user, request the data, and sift through the results in order to provide cellular network service to the user. For example, a user experiencing a service issue may have cellular network data (e.g., transaction histories, payments, event histories, device statuses, etc.) across several different cellular network management systems. Each cellular network management system may have an associated database, each with different (or sometimes overlapping) cellular network data associated with the user. To further complicate matters, each database may utilize a different cellular network identifier associated with the user (e.g., mobile number, subscriber number, username, etc.). To identify a cause of the service issue, the wireless network provider may need to pull all cellular network identifiers associated with the user, access each associated database, and then determine the cause of the service error. Thus, there is a need to develop systems and methods to easily access and compile cellular network data to more efficiently identify and resolve issues causing service problems for users.

One solution may be to provide a centralized platform for communicating with one or more cellular network management system. A cellular network identifier mapped to a user may be received by a cellular network system via a graphical user interface (GUI). The cellular network identifier may be received as part of a request for cellular network data. The cellular network identifier may include a mobile station international subscriber directory number (MSISDN), an International Mobile Equipment Identity (IMEI), a cellular network account number, or any other such identifier. Then, the cellular network system may receive a selection of a cellular network management system that handles the desired cellular network data (e.g., by a selection corresponding to a user input in the GUI). The cellular network system may then access the selected cellular network management via an application programming interface (API) selected from a plurality of APIs. The API may return the requested cellular network data and/or a second cellular network identifier, also mapped to the user. The cellular network system may output a context view for display in the GUI, including the first and second cellular network identifiers. This may enable results of subsequent requests to be filtered based on at least one of the first and second cellular network identifiers. The cellular network system may also output at least a portion of the requested data for display in a data window of the GUI. The cellular network system may then output a historical view of the request for display in a history window of the GUI. Subsequent requests may then be selected via the GUI, to locate more data via other APIs. In this way, context is continuously built and tracked as a problem is being resolved. The systems and methods herein may provide for the more efficient solving and tracking of problems, resulting in more efficient problem resolution and more uptime for UEs.

FIG. 1 illustrates a system 100 for resolving problems experienced by a user associated with a wireless network provider 102, according to certain embodiments. The system 100 may include the wireless network provider 102. The wireless network provider 102 may include a computing system 104 (e.g., a cellular network system) with a graphical GUI 103, APIs 106a-c, and databases 108a-b. A database 108c may be outside of the wireless network provider 102. For example, the database 102c may be a component of a third-party cellular network management system (e.g., a third party warehouse, vendor, service provider, etc.).

The wireless network provider 102 may be a 5G cellular network provider. The wireless network provider 102 may administer a open radio access network (ORAN) in order to provide a standalone 5G network to one or more users of the wireless network provider 102. Some or all of the components and/or services of the wireless network provider 102 may be hosted by publicly-available could service.

The computing system 104 may generate the GUI 105 for display. The GUI 105 may provide one or more graphical elements that allow for user input. For example, a graphical element may be associated with a plurality of cellular network management systems. Each of the plurality of cellular network management systems may further be associated with a respective API 106a-c. For example, a graphical element may be associated with an "orders" request. The orders request may generate a request 105 include context associated with a user and/or a session of the computing system 104. The request 105 may then transmitting to the API 106a, which may then query the database 108a, the database 108a being a component of a cellular network management system (e.g., the cellular network management system(s) involved in placing and fulfilling orders). In another example, a second graphical element may be associated with an "events" request. Then, the request 105 may be require information (e.g., cellular network data) from multiple cellular network management systems to fulfil the order. Thus, in response to an input correlated to the events request, the computing system 104 may transmit the request 105 to multiple cellular network management systems via one or more APIs. Thus, the computing system 104 may access a 5G network core and the associated database 108b via the API 106b and access an external database 108c via the API 106c (e.g., to determine a port-in or a port-out status). In response to the request(s), cellular network data may be provided to the computing system 104. Other examples of cellular network management systems and requests are described in relation to FIG. 2A. Some or all of the cellular network data may then be output for display by the computing system (e.g., in the GUI). Using the cellular network data, subsequent requests for other cellular network data may be generated and/or filtered, such that only the cellular network data relevant to the previous requests are received.

Although only three APIs 106a-c are shown in FIG. 1, it should be understood that any number of APIs may be present. Similarly, any number of databases may be present, both as a part of the wireless network provider 102 and/or external to the wireless network provider 102. While FIG. 1 (and subsequent figures) describe the systems and methods in relation to a cellular network system, the systems and methods described here in may have broad applicability to a variety of industries. One of ordinary skill in the art would recognize many different possibilities.

Figure 2A:
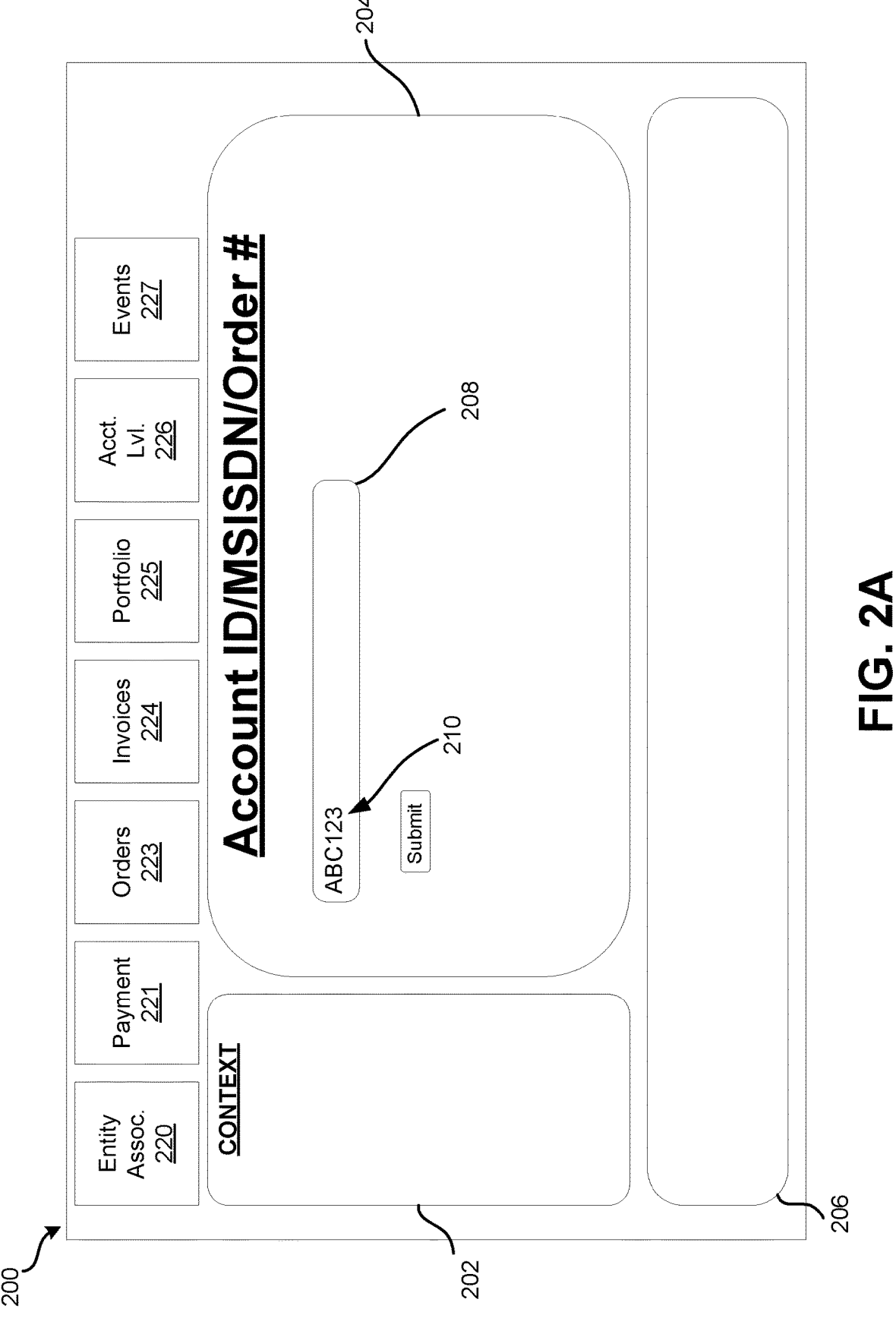
FIGS. 2A-2D illustrate a graphical user interface of a cellular network system for communicating with a cellular network management system.

FIG. 2A illustrates graphical user interface (GUI) 200 of a cellular network system with a first cellular network identifier. The GUI 200 may include a context window 202, a data window 204 and a historical window 206. The data window 204 may further include a graphical element that allows for an input, such as input box 208. The input box 208 may be configured to receive a cellular network identifier 210.

The GUI 200 may also include one or more buttons 220-227 associated with respective cellular management systems. Although FIG. 2A shows the buttons 220-227, any graphical element may be associated with the respective cellular network management systems. For example, in addition to or instead of the buttons 220-227, the GUI 200 may include pull down menus, input boxes, radio buttons, fill bubbles, or any other suitable input for indicating a desired cellular network management system. It should be understood that the names and descriptions of the cellular network management systems shown in FIGS. 2A-D are merely examples. Similar cellular network management systems may have different names, some cellular network management systems may have different functionality, and/ or some cellular network management systems may not be included in the GUI 200. Each of the cellular network management systems may be associated with one or more APIs and databases, such as the APIs 106*a-c* and the databases 108*a-c*.

Figure 2B:
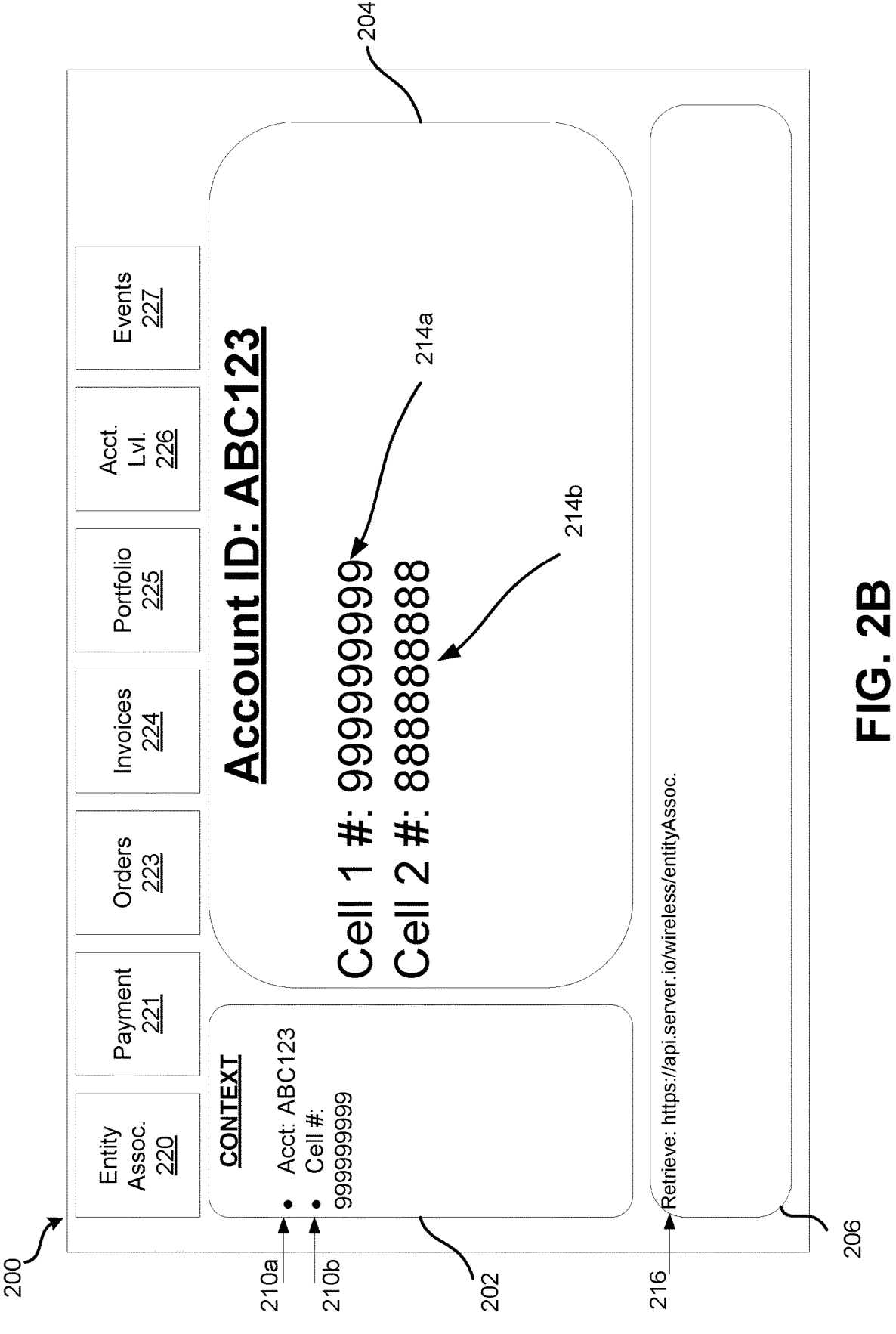

The entity association button 220 may cause the cellular network system to make one or more API calls to one or more cellular network management systems based on the cellular network identifier 210 (and/or by "context" displayed in the context window 202, as in FIG. 2B). The one or more API calls may return information including any related identifiers mapped to the user. In some embodiments, the entity associated button 220 (and related API calls) may be a default operation. For example, the input box 208 may be configured to accept one of several different cellular network identifiers. The cellular network identifiers may include an MSISDN, an IMEI number, a cellular network account number or account name, or any other such identifier mapped to a user, either directly (e.g., an account number) or indirectly (e.g., an IMEI number indicating a particular UE, which is in turn mapped to the user). In the example shown in FIG. 2A, the cellular network identifier may be an account number. As the default operation, the entity associated API calls may submit the cellular network identifier 210 to one or more cellular network management systems and return other cellular network identifiers (as seen in FIG. 2B). The cellular network system (e.g., the computing system 104 in FIG. 1) may determine that the cellular network identifier 210 is an account number, then return cellular network identifiers that are not the account number (e.g., an MSISND). If, alternatively, a MSISDN is entered into the input box 208, the account number may be returned. Other combinations would be obvious to one of ordinary skill in the art.

The payment button 221 may cause the cellular network system to make one or more API calls to cellular network management systems associated with payments. These systems may include processing services, internal accounting systems, external accounting systems, external banks, etc. The orders button 223 may cause the cellular network system to make one or more API calls to cellular network management systems and return information associated with orders made by the user. The returned information may include a purchase history, steps made by back-end systems (e.g., servers) during a purchase, external vendor records, etc. The invoices button 224 may cause the cellular network system to make one or more API calls to return invoices associated with the user (and statuses thereof). The portfolio button 225 may cause the cellular network system to make one or more API calls to return an account overview (e.g., all mobile numbers associated with the user, UE details, demographic information's, etc.). The account level button 226 may cause the cellular network system to make one or more API calls to return an account hierarchy and related information. For example, the user may map to a cellular network identifier that is not a primary identifier of an associated account (e.g., a child line vs. a parent line). The events button 227 may cause the cellular network system to make one or more API calls to return a history of at least some events associated with the user. For example, the APIs associated with the events button 227 may return port-in-port out information, billing information, invoicing information, communication data (e.g., call data records, SMS record data, etc.), UE activation information, SIM card information, and other such information.

As shown in FIG. 2A, the context window 202 and the historical window 206 may not include any information due to no queries being submitted through the GUI 200 in a current session. In other words, the cellular network system may not be being used to determine the cause of a problem. The entry of the cellular network identifier 210 into the input box 208 may start a session. During the session, the cellular network system may cause information to be displayed in the context window 202 and the historical window 206.

FIG. 2B illustrates the GUI 200 of the cellular network system after a cellular network identifier was submitted, according to certain embodiments. As shown in FIG. 2A, the cellular network identifier 210 was an account ID. When the cellular network identifier 210 was submitted, the cellular network system may have made one or more API calls to determine one or more other cellular network identifiers. As shown in FIG. 2B, the cellular network system may have received cellular network data indicating that the MSISDN 214*a-b* are mapped to the user and thus to the cellular network identifier 210 (i.e., "Acct. ABC123"). Thus, based on the returned cellular network data, the data window 204 may display both the MSISDN 214*a-b*. The 214*a-b* in the data window 204 may include a hyperlink or other graphical element to allow a selection to be made.

In the example shown in FIG. 2B, the MSISDN 214*a* may be selected. For example, the user may be having an issue with the MSISDN 214*a* (or the UE attached to the MSISDN 214*a*). The cellular network system may cause the context window 202 to display the account ID as context 210*a*, based on the account ID being entered into the input box 208 in FIG. 2A. After the selection of the MSISDN 214*a*, the context window 202 may also display the MSISDN 214*a* as context 210*b*. In other words, as the cellular network system receives more information and/or cellular network data, context for the problem being experienced by the user may be narrowed. For example, if in a subsequent action, the invoices button 224 is selected (thereby selecting a cellular network management system associated with invoicing), the respective APIs may only return invoices associated with the MSISDN 214*a*. Furthermore, the cellular network data provided in the subsequent action and displayed in the data window 204 may also be presented with a quick reference to which cellular network identifiers are relevant to the cellular network data (e.g., providing context). The historical window 206 may now display a history of the API call made in relation to FIG. 2A (here, API calls related to the Entity Association button 220). The historical window 206 may therefore provide a detailed historical view of all API calls made during the session.

Figure 2C:
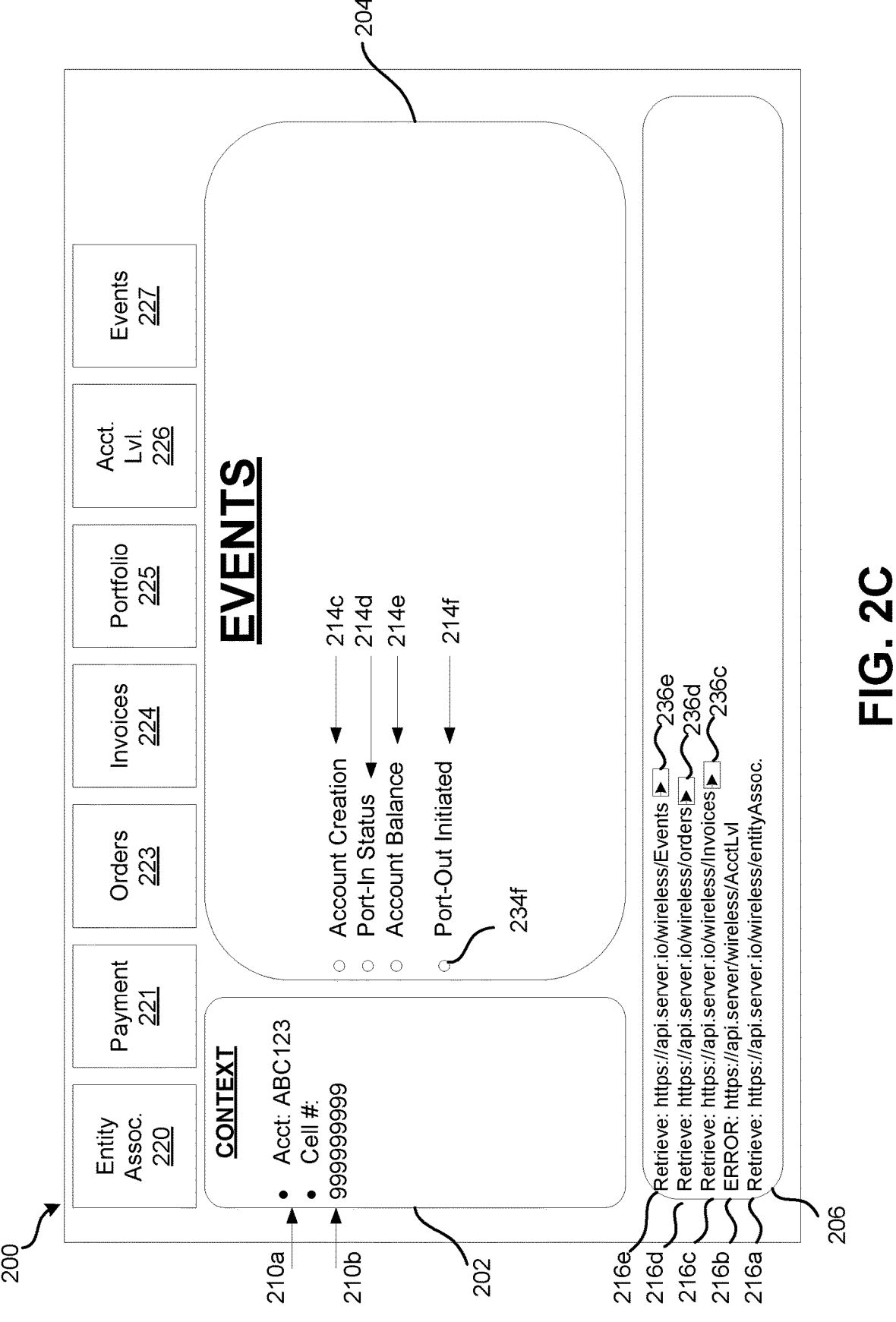

FIG. 2C illustrates the GUI 200 of the cellular network system after receiving cellular network data from a cellular network management system, according to certain embodiments. The GUI 200 shown in FIG. 2C may include more entries 216*a-e* in the historical window 206 than is shown in FIG. 2. Each entry in the historical window 206 may correspond to a previous request made by the cellular network system to a particular cellular network management system. For example, the entry 216*a* may correspond to the initial API call, where the 214*a* was returned. The entry 216*b* may correspond to API call(s) made by the cellular network system in response to a selection of the account level button 226. The API call may have failed (e.g., due to connectivity issues, timeouts, null return, etc.). A log of the failed API call may therefore be represented by the entry 216*b*.

In attempting to address the problem the user is experiencing, the cellular network system may have also called the cellular network management system(s) involved in invoices and orders, as represented by the entries 216*c-d*. Each of the entries 216*c-d* may have a respective optical element 236*c-d*. The respective optical element 236*c-d* may accept an input that causes the cellular network system to open a window including a detailed view of the cellular network data retrieved in response to the respective API call. For example, the entry 216*d* may represent a previous API call associated with the invoices button 224. The cellular network system may have received and stored invoice data in response to the previous API call. In response to an input corresponding to the graphical element 236*c*, the cellular network system may open a new window, either as a part of the GUI 200 or as a separate window/application, and display some or all of the invoice data. In other words, the cellular network system may store the cellular network data received from various API calls for future reference and provide a means to access the cellular network data via the historical window 206.

As seen in FIG. 2C, the cellular network system may have made other API calls after the invoice call represented by the entry 216*c* (e.g., an API call corresponding to the orders button 223 and then the current call corresponding to the events button 227). The historical window 206 and entries 216*a-e* thereby provide a means to easily view the session history and access cellular network data received from previous calls at any point in the session. Only those previous calls that were successful in receiving the requested cellular network data may include optical elements, such as the optical elements 236*c-e*.

In FIG. 2C, the data window 204 may show cellular network data 214*c-f* ("events data") received in response to API calls associated with the events button 227. The data window 204 may represent the events data 214*c-f* may be a simplified view of one or more events associated with the user according to the context displayed in the context window 202. In other words, the events data 214 *c-f* may only include those events that are relevant to the context 210*a* (account ID ABC123) in relation to the context 210*b* (e.g., the MSISDN 214*a*, or "999999999"). In some embodiments, only the event data within a certain time frame (e.g., 1 month, 1 year, etc.) may be displayed. More detailed events data may be displayed in a new window in response to an input correlated to the optical element 236*e*.

Furthermore, each of the events data 214*c-f* may include more data than is displayed in the data window 204 according to the view shown in FIG. 2C. Each of the events data 214*c-f* may therefore have an associated optical element to accept an input from a user. For example, the events data 214*f* may be associated with a port-out, or transferring the MSISDN 214*a* to another account or wireless network provider. While the view shown in FIG. 2C may communicate that there is some port-out activity associated with the user, few other details may be provided. The associated optical element 234*f* may accept an input and display a more detailed view of the events data 214*f* in the data window 204.

Figure 2D:
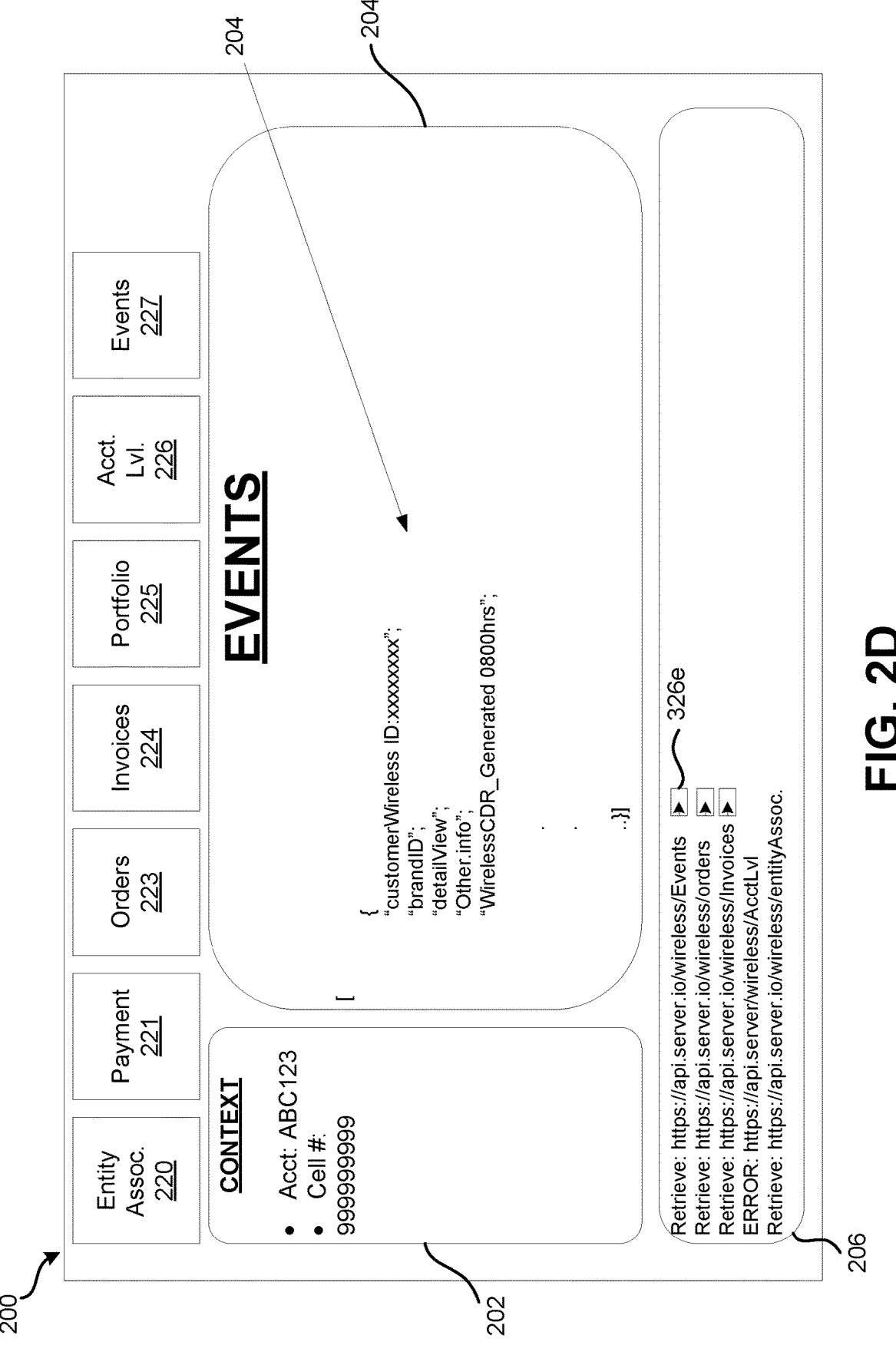

FIG. 2D illustrates the GUI 200 displaying a detailed view 244 in the data window 204, according to some embodiments. The detailed view 244 may be displayed in the data window 204 in response to a user input corresponding to the optical element 234*f* in FIG. 2C. The detailed view 244 may therefore be a portion of the cellular network data returned in response to API calls related to the events button 227. The portion of the cellular network data may be related to a port-out action, as described in FIG. 2C. In response to an input corresponding to the optical element 326*e*, all of the events data 214*c-f* may be displayed in a different window. Thus, the detailed view 244 may only include a portion of the events data 214*c-f* (e.g., the events data 214*f*). Like the full events data 214*c-f*, the detailed view 244 may be filtered at least in part based on the context 210*a-n* in the context window 202. Furthermore, the full events data 214*c-f* may be accessible via the historical window 206.

Figure 3:
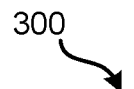
FIG. 3 illustrates a flowchart of a method for communicating with a cellular network management system, according to certain embodiments.
Figure 3:
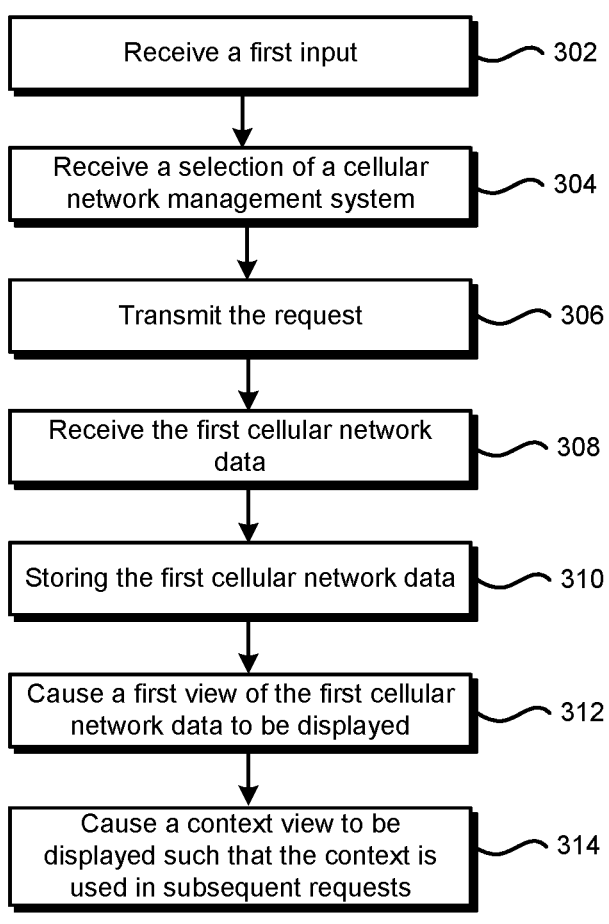

FIG. 3 illustrates a flowchart of a method 300 for communicating with a cellular network management system, according to certain embodiments. The method 300 may be performed by some or all of the systems described herein, such as the system 100 in FIG. 1. Some or all of the steps described herein may be performed in a different order than is shown or described, or may be combined with other steps. In some embodiments, some steps may be skipped altogether.

At step 302, the method 300 may include receiving, by a cellular network system, a first input via a GUI. The first input may correspond to a request for first cellular network data and include a first cellular network identifier mapped to a user. The cellular network system may include one or more computing device, such as the computing system 104 in FIG. 1. The cellular network system may be a component of and/or administered by a wireless network provider (e.g., the wireless network provider 102).

The GUI may be similar to the GUI 200 in FIGS. 2A-2D. The GUI may include one or more elements to receive inputs, (e.g., the buttons 220-227, the input box 208, etc.). The first input may be the first cellular network identifier, such as an account ID, MSISDN, or other similar identifier.

At step 304, the method 300 may include receiving, by the cellular network system, a selection of a cellular network management system from a plurality of cellular network management systems. Each of the plurality of cellular network management systems may be individually accessible from the GUI. For example, the buttons 220-227 in FIGS. 2A-2D may each be associated with one (or more) cellular network management systems. The cellular network management systems may be accessible via the buttons or by any other appropriate method within the GUI.

At step 306, the method 300 may include transmitting, by the cellular network system, the request for the first cellular network data to the selected cellular network management system. The cellular network system may transmit the request via a first API(s), selected based on the selected cellular network management system. For example, the cellular network system may receive a selection for the events button 227 in FIG. 2A. Then, the cellular network system may identify and transmit the request through one or more APIs as appropriate to fulfill the request. The one or more APIs may communicate with different cellular network management systems or may communicate with the same cellular network management systems, requesting for different data.

At step 308, the method 300 may include receiving, by the cellular network system and from the cellular network management system, the first cellular network data via the first API. The first cellular network data may include a second cellular network identifier. For example, the request may include the first cellular network identifier as an account ID. The first cellular network data may then include one or more MSISDNs, mapped to the account ID (e.g., the MSISDNs 214*a-b*).

At step 310, the method 300 may include storing, by the cellular network system, the first cellular network data, the first cellular network identifier, and the second cellular network identifier. The first cellular network identifier and the second cellular network identifier may be stored to provide context for later API calls and/or operations. The first cellular network data may be stored to provide a more detailed view of the first cellular network data, either in the GUI or outside of the GUI in another window or application.

At step 312, the method 300 may include causing, by the cellular network system, a first view of the first cellular network data to be displayed. The first view may be displayed in a data window, such as the data window 204 in FIGS. 2A-2D. The cellular network system may also cause a graphical element associated with the first cellular network data to be displayed. The graphical element may be configured to cause the cellular network system to display a second view of the first cellular network data (e.g., the detailed view 244 in FIG. 2D). The graphical element may cause the cellular network system to display the second view in response to a user input.

At step 314, the method 300 may include causing, by the cellular network system, a context view to be displayed within the GUI. The context view may include the first cellular network identifier and the second cellular network identifier and represent a context of the first request and/or session. In some embodiments, the context view (e.g., the context window 202) may be empty before a session is started. Then, in response to the first input, the cellular network system may cause the first cellular network identifier to be displayed in the context view. The cellular network system may then update the context view to include the second cellular network identifier based at least in part in the first cellular network data. The context may be used in subsequent requests made to other APIs.

In some embodiments, the cellular network system may receive a selection of a second cellular network management system from the plurality of cellular network management systems that are individually accessible via the GUI. The cellular network system may the transmit a second request for second cellular network data to the second selected cellular network management system via a second API. The second request may be based on at least one of the first cellular network identifier and the second cellular network identifier. The second API may be selected from the plurality of APIs and based on the second selected cellular network management system. For example, after the initial request, the cellular network system may receive a request corresponding to the events button 227. Then, the request may only include a request for data relevant to both the first and second cellular network identifiers. In other words, the cellular network data may use the first and second cellular network identifiers as context, and the respective APIs may only return the relevant cellular network data. The second cellular network data may include a third cellular network identifier (e.g., an MSISDN). The second cellular network data and the third cellular network identifier may then be stored by the cellular network system. The cellular network system may then cause a first view of the second cellular network data to be displayed (e.g., in the data window 204) along with a graphical element associated with the second cellular network data. The graphical element may cause the cellular network system to display a second view of the second cellular network data in response to a user input. The cellular network system may then update the context view of the GUI to include the third cellular network identifier.

In some embodiments, the first API may query a database associated with a respective cellular network management system. For example, the first API may query a database containing cellular network data indicating one or more user devices associated with the user (e.g., APIs associated with the portfolio button 225). The first API may additionally or alternatively query a historical database comprising cellular network data relating to one or more orders associated with the user (e.g., APIs associated with the orders button 223). In another example, the first API may query a database(s) comprising cellular network information indicating one or more events associated with the user (e.g., APIs associated with the events button 227). In yet another example, the first API may query one or more account identifiers associated with the user (e.g., APIs associated with the entity association button 220). In yet another example, the first API may query cellular network invoices associated with the user (e.g., APIs associated with the invoices button 224).

In some embodiments, the first API and selected cellular network management system may be a component a wireless network provider (e.g., the wireless network provider 102). The wireless network provider may be a 5G wireless network provider. In some embodiments, the first API and selected cellular network management system may be associated with a third party (e.g., a second wireless network provider). In some embodiments, a third display window comprises an error message associated with a failed API call.

Figure 4A:
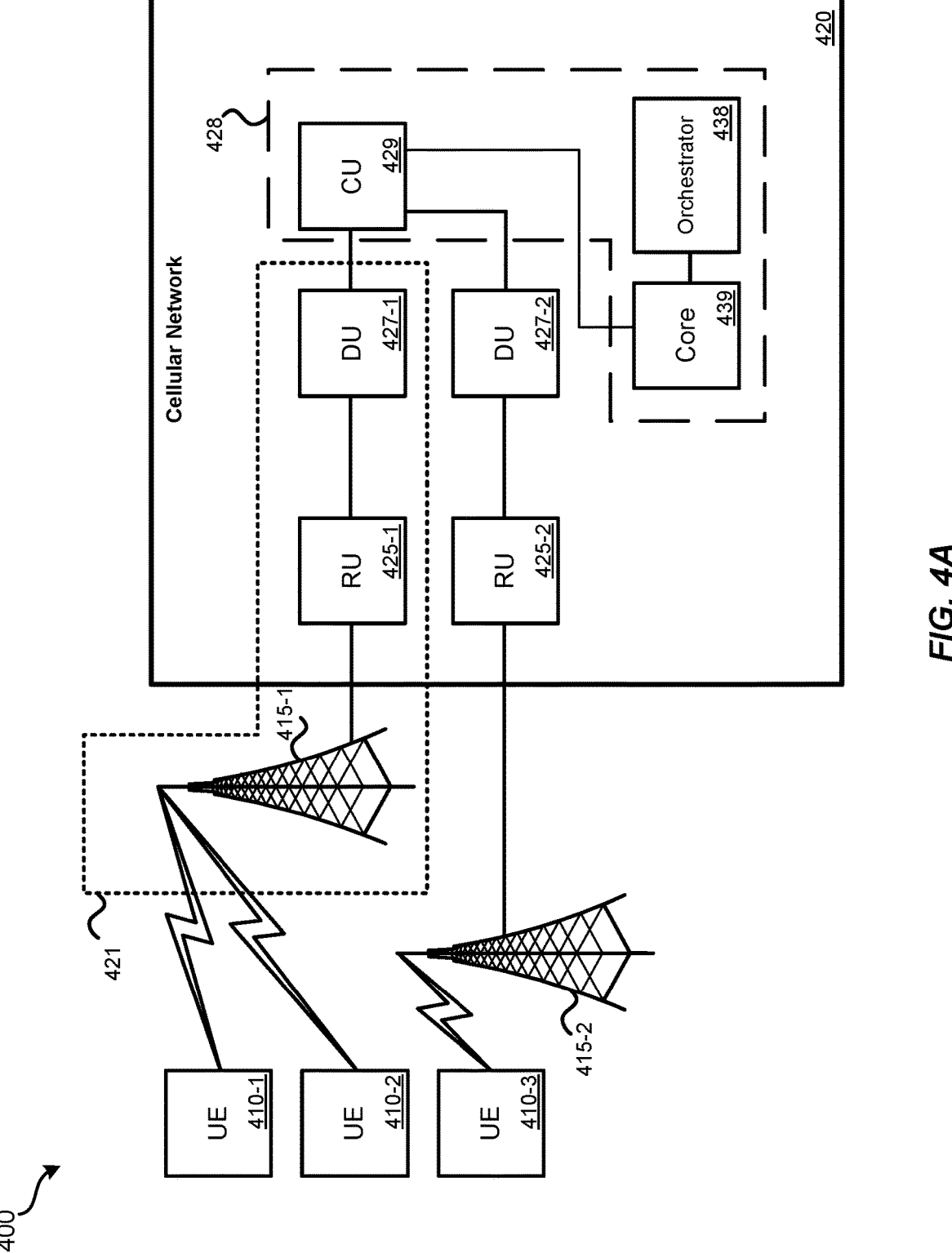
FIG. 4A illustrates an embodiment of a cellular network system, according to certain embodiments.

FIG. 4A illustrates an embodiment of a cellular network system 400 ("system 400"), according to certain embodiments. System 400 can include a fifth generation (5G) New Radio (NR) cellular network; other types of cellular networks, such as fourth generation (4G) long-term evolution (LTE) cellular network, sixth generation (6G) cellular network, seventh generation (7G) cellular network, etc. are also possible. System 400 can include: UE 410 (UE 410-1, UE 410-2, UE 410-3); base station 415; cellular network 420; radio units 425 ("RUs 425"); distributed units 427 ("DUs 427"); centralized unit 429 ("CU 429"); core 439, and orchestrator 438. FIG. 4A represents a component level view. In a virtualized open radio access network (O-RAN), because components can be implemented as software in the cloud, except for components that receive and transmit RF, the functionality of various components can be shifted among different servers, for which the hardware may be maintained by a separate (e.g., public) cloud-service provider, to accommodate where the functionality of such components is needed, such as detailed in relation to FIG. 5.

UE 410 can represent various types of end-user devices, such as smartphones, cellular modems, cellular-enabled computerized devices, sensor devices, manufacturing equipment, gaming devices, access points (APs), any computerized device capable of communicating via a cellular network, etc. UE can also represent any type of device that has incorporated a cellular (e.g., 5G) interface, such as a 5G modem. Examples include sensor devices, Internet of Things (IoT) devices, manufacturing robots; unmanned aerial (or land-based) vehicles, network-connected vehicles, environmental sensors, etc. UE 410 may use RF to communicate with various base stations of cellular network 420. Two base stations 415 (BS 415-1, 415-2) are illustrated. Real-world implementations of system 400 can include many (e.g., hundreds, thousands) base stations, and many RUs, DUs, and CUs. BS 415 can include one or more antennas that allow RUs 425 to communicate wirelessly with UEs 410. RUs 425 can represent an edge of cellular network 420 where data is transitioned to wireless communication. In some implementations, the radio access technology (RAT) used by RU 425 is 5G New Radio (NR). Other implementations use other RAT, such as 4G Long Term Evolution (LTE). The remainder of cellular network 420 may be based on an exclusive 5G architecture, a hybrid 4G/5G architecture, a 4G architecture, or some other cellular network architecture. Base station equipment 421 may include an RU (e.g., RU 425-1) and a DU (e.g., DU 427-1) located on site at the base station. In some embodiments, the DU may be physically remote from the RU. For instance, multiple DUs may be housed at a central location and connected to geographically distant (e.g., within a couple of kilometers) RUs.

One or more RUs, such as RU 425-1, may communicate with DU 427-1. As an example, at a possible cell site, three RUs may be present, each connected with the same DU. Different RUs may be present for different portions of the spectrum. For instance, a first RU may operate on the spectrum in the citizens broadcast radio service (CBRS) band while a second RU may operate on a separate portion of the spectrum, such as, for example, "band 71" (a radiofrequency band near 600 Megahertz allocated for cellular communications). One or more DUs, such as DU 427-1, may communicate with CU 429. Collectively, RUs, DUs, and CUs create a gNodeB, which serves as the radio access network (RAN) of cellular network 420. CU 429 can communicate with core 439. The specific architecture of cellular network 420 can vary by embodiment. Edge cloud server systems outside of cellular network 420 may communicate, either directly, via the Internet, or via some other network, with components of cellular network 420. For example, one or more DUs 427-1 may be able to communicate with an edge cloud server system without routing data through CU 429 or core 439.

At a high level, the various components of a gNodeB can be understood as follows: RUs perform RF-based communication with UE. DUs support lower layers of the protocol stack such as the radio link control (RLC) layer, the medium access control (MAC) layer, and the physical communication layer. CUs support higher layers of the protocol stack such as the service data adaptation protocol (SDAP) layer, the packet data convergence protocol (PDCP) layer and the radio resource control (RRC) layer. A single CU can provide service to multiple co-located or geographically distributed DUs. A single DU can communicate with multiple RUs.

Figure 4B:
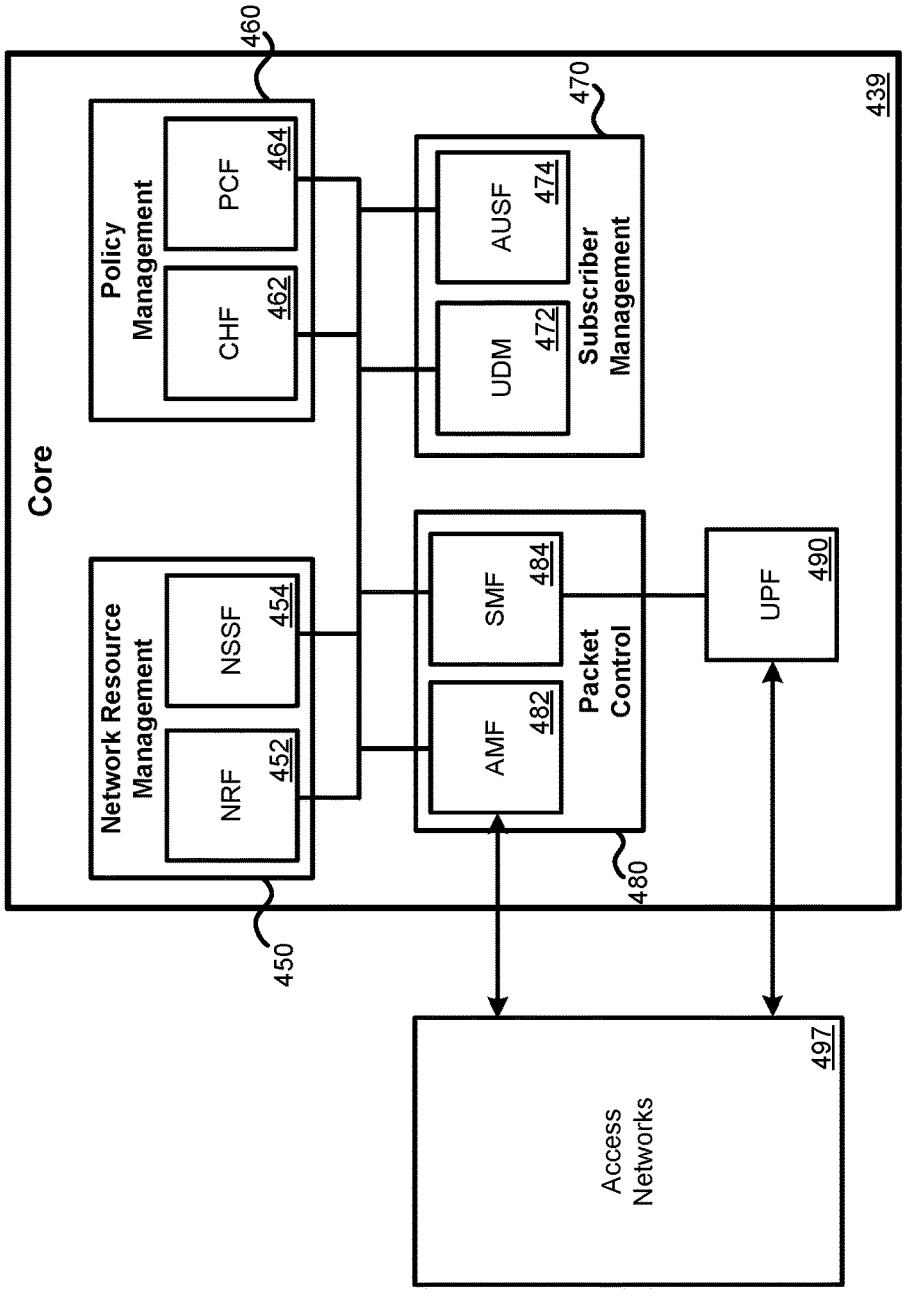
FIG. 4B illustrates an exemplary core, according to certain embodiments.
Figure 4B:

Further detail regarding exemplary core 439 is provided in relation to FIG. 4B. FIG. 4B illustrates an exemplary core 439, according to certain embodiments. The exemplary core 439 can be physically distributed across data centers or located at a central national data center (NDC), such as detailed in relation to FIG. 5, can perform various core functions of the cellular network. Core 439 can include: network resource management components 450; policy management components 460; subscriber management components 470; and packet control components 480. Individual components may communicate via a bus, thus allowing various components of core 439 to communicate with each other directly. Core 439 is simplified to show some key components. Implementations can involve additional components.

Network resource management components 450 can include: Network Repository Function (NRF) 452 and Network Slice Selection Function (NSSF) 454. NRF 452 can allow 5G network functions (NFs) to register and discover each other via a standards-based application programming interface (API). NSSF 454 can be used by AMF 482 to assist with the selection of a network slice that will serve a particular UE (e.g., UEs 410 of FIG. 4A).

Policy management components 460 can include: Charging Function (CHF) 462 and Policy Control Function (PCF) 464. CHF 462 allows charging services to be offered to authorized network functions. Converged online and offline charging can be supported. PCF 464 allows for policy control functions and the related 5G signaling interfaces to be supported.

Subscriber management components 470 can include: Unified Data Management (UDM) 472 and Authentication Server Function (AUSF) 474. UDM 472 can allow for generation of authentication vectors, user identification handling, NF registration management, and retrieval of UE individual subscription data for slice selection. AUSF 474 performs authentication with UEs.

Packet control components 480 can include: Access and Mobility Management Function (AMF) 482 and Session Management Function (SMF) 484. AMF 482 can receive connection- and session-related information from UEs and is responsible for handling connection and mobility management tasks. SMF 484 is responsible for interacting with the decoupled data plane, creating updating and removing Protocol Data Unit (PDU) sessions, and managing session context with the User Plane Function (UPF).

User plane function (UPF) 490 can be responsible for packet routing and forwarding, packet inspection, quality of service (QOS) handling, and external PDU sessions for interconnecting with a Data Network (DN) (e.g., the Internet) or various access networks 497. Access networks 497 can include the RAN of cellular network 420 of FIG. 4A.

While FIGS. 4A and 4B illustrate various components of cellular network 420, it should be understood that other embodiments of cellular network 420 can vary the arrangement, communication paths, and specific components of cellular network 420. While RU 425 may include specialized radio access componentry to enable wireless communication with UE 410, other components of cellular network 420 may be implemented using either specialized hardware, specialized firmware, and/or specialized software executed on a general-purpose server system. In a virtualized arrangement, specialized software on general-purpose hardware may be used to perform the functions of components such as DU 427, CU 429, and core 439. Functionality of such components can be co-located or located at disparate physical server systems. For example, certain components of core 439 may be co-located with components of CU 429.

Returning to FIG. 1A, some O-RAN implementations of the DUs 427, CU 429, core 439, and/or orchestrator 438 are implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system. In the illustrated embodiment of system 400, cloud-based cellular network components 128 include CU 429, core 439, and orchestrator 438. In some embodiments, DUs 427 may be partially or fully added to cloud-based cellular network components 428. Such cloud-based cellular network components 428 may be executed as specialized software executed by underlying general-purpose computer servers. Cloud-based cellular network components 428 may be executed on a public third-party cloud-based computing platform or a cloud-based computing platform operated by the same entity that operates the RAN. A cloud-based computing platform may have the ability to devote additional hardware resources to cloud-based cellular network components 428 or implement additional instances of such components when requested. A "public" cloud-based computing platform refers to a platform where various unrelated entities can each establish an account and separately utilize the cloud computing resources, the cloud computing platform managing segregation and privacy of each entity's data.

Kubernetes, or some other container orchestration platform, can be used to create and destroy the logical DU, CU, or 5G core units and subunits, as needed, for the cellular network 420 to function properly. Kubernetes allows for container deployment, scaling, and management. As an example, if cellular traffic increases substantially in a region, an additional logical DU or components of a DU may be deployed in a data center near where the traffic is occurring without any new hardware being deployed; rather, processing and storage capabilities of the data center would be devoted to the needed functions. When the need for the logical DU or subcomponents of the DU no longer exists (i.e., when traffic subsequently decreases), Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 438. Orchestrator 438 can represent various software processes executed by underlying computer hardware. Orchestrator 438 can monitor cellular network 420 and determine the amount and location at which cellular network functions should be deployed to meet or attempt to meet service level agreements (SLAs) across slices of the cellular network.

Orchestrator 438 can allow for the instantiation of new cloud-based components of cellular network 420. As an example, to instantiate a new DU, orchestrator 438 can perform a pipeline of calling the DU code from a software repository incorporated as part of, or separate from, cellular network 420; pulling corresponding configuration files (e.g., helm charts); creating Kubernetes nodes/pods; loading DU containers; configuring the DU; and activating other support functions (e.g., Prometheus, instances/connections to test tools).

A network slice functions as a virtual network operating on cellular network 420. Cellular network 420 is shared with some number of other network slices, such as hundreds or thousands of network slices. Communication bandwidth and computing resources of the underlying physical network can be reserved for individual network slices, thus allowing the individual network slices to reliably meet particular service level agreement (SLA) levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, such allocations also account for resource limitations, such as to avoid allocation of an excess of resources to any particular UE group and/or application. Further, a cost may be attached to cellular slices: the greater the amount of resources dedicated, the greater the cost to the user; thus, optimization between performance and cost is desirable.

Particular network slices may only be reserved in particular geographic regions. For instance, a first set of network slices may be present at RU 425-1 and DU 427-1; and a second set of network slices, which may only partially overlap or may be wholly different from the first set, may be reserved at RU 425-2 and DU 427-2.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

As illustrated in FIG. 4A, UE 410 may be operating on one or more production slices of cellular network 420. As detailed later in this document, a UE that functions on a particular entity's local network may be assigned to a slice particular to the entity or a slice that provides a particular QoE for tasks to be performed by the entity's UE.

Components such as DUs 427, CU 429, orchestrator 438, and core 439 may include various software components that are required to communicate with each other, handle large volumes of data traffic, and are able to properly respond to changes in the network. In order to ensure not only the functionality and interoperability of such components, but also the ability to respond to changing network conditions and the ability to meet or perform above vendor specifications, significant testing must be performed.

Figure 5:
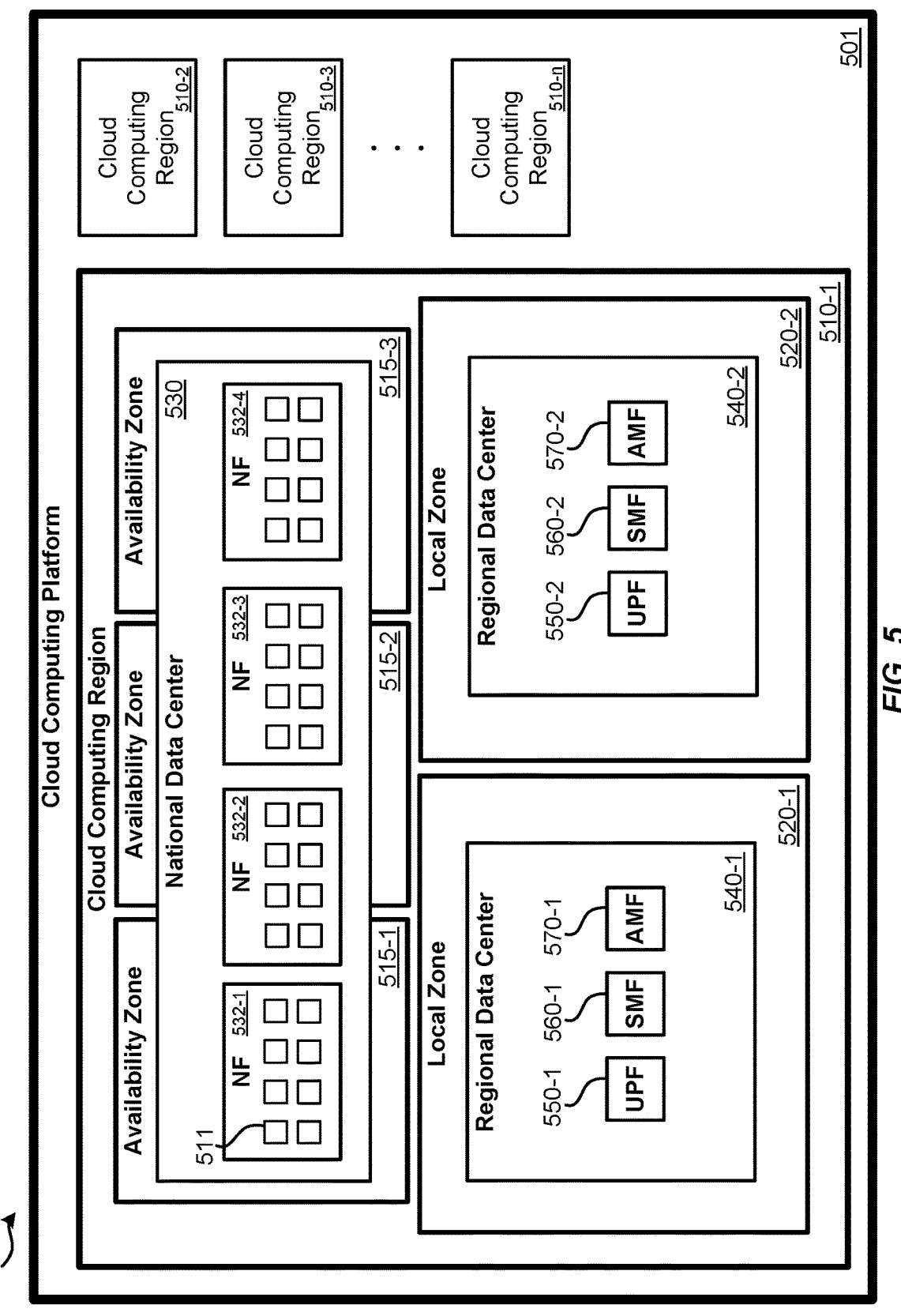
FIG. 5 illustrates an embodiment of a cellular network core network topology as implemented on a public cloud-computing platform, according to certain embodiments.

FIG. 5 illustrates an embodiment of a cellular network core network topology 500 as implemented on a public cloud-computing platform, according to certain embodiments. The cellular network core network topology 500 can be an implementation of the core 439 of FIGS. 1A and/or 1B. Cellular network core network topology 500 can represent how logical cellular network groups are distributed across cloud computing infrastructure of cloud computing platform 501. Cloud computing platform 501 can be logically and physically divided up into various different cloud computing regions 510. Each of cloud computing regions 510 can be isolated from other cloud computing regions to help provide fault tolerance, fail-over, load-balancing, and/ or stability and each of cloud computing regions 510 can be composed of multiple availability zones, each of which can be a separate data center located in general proximity to each other (e.g., within 600 miles). Further, each of cloud computing regions 510 may provide superior service to a particular geographic region based on physical proximity. For example, cloud computing region 510-1 may have its datacenters and hardware located in the northeast of the United States while cloud computing region 510-2 may have its datacenters and hardware located in California. For simplicity, the details of the cellular network as executed in only cloud computing region 510-1 is illustrated. Similar components may be executed in other cloud computing regions of cloud computing regions 510 (510-2, 510-3, 510-*n*).

In other embodiments, cloud computing platform 501 may be a private cloud computing platform. A private cloud computing platform may be maintained by a single entity, such as the entity that operates the hybrid cellular network. Such a private cloud computing platform may be only used for the hybrid cellular network and/or for other uses by the entity that operates the hybrid cellular network (e.g., streaming content delivery).

Each of cloud computing regions 510 may include multiple availability zones 515. Each of availability zones 515 may be a discrete data center or group of data centers that allows for redundancy that allows for fail-over protection from other availability zones within the same cloud computing region. For example, if a particular data center of an availability zone experiences an outage, another data center of the availability zone or separate availability zone within the same cloud computing region can continue functioning and providing service. A logical cellular network component, such as a national data center, can be created in one or across multiple availability zones 515. For example, a database that is maintained as part of NDC 530 may be replicated across availability zones 515; therefore, if an availability zone of the cloud computing region is unavailable, a copy of the database remains up-to-date and available, thus allowing for continuous or near continuous functionality.

On a (e.g., public) cloud computing platform, cloud computing region 510-1 may include the ability to use a different type of data center or group of data centers, which can be referred to as local zones 520. For instance, a client, such as a provider of the hybrid cloud cellular network, can select from more options of the computing resources that can be reserved at an availability zone 515 compared to a local zone 520. However, a local zone 520 may provide computing resources nearby geographic locations where an availability zone 515 is not available. Therefore, to provide low latency, certain network components, such as regional data centers 540, can be implemented at local zones 520 rather than availability zones 515. In some circumstances, a geographic region can have both a local zone 520 and an availability zone 515.

In the topology of a 5G NR cellular network, 5G core functions of core 439 can logically reside as part of a national data center (NDC) 530. NDC 530 can be understood as having its functionality existing in cloud computing region 510-1 across multiple availability zones 515. At NDC 530, various network functions, such as NFs 532, are executed. For illustrative purposes, each NF 532, whether at NDC 530 or elsewhere located, can be comprised of multiple sub-components, referred to as pods (e.g., pod 511) that are each executed as a separate process by the cloud computing region 510. The illustrated number of pods 511 is merely an example; fewer or greater numbers of pods 511 may be part of the respective 5G core functions. It should be understood that in a real-world implementation, a cellular network core, whether for 5G or some other standard, can include many more network functions. By distributing NFs 532 across availability zones 515, load-balancing, redundancy, and fail-over can be achieved. In local zones 520, multiple regional data centers 540 can be logically present. Each of regional data centers 540 may execute 5G core functions for a different geographic region or group of RAN components. As an example, 5G core components that can be executed within an RDC, such as RDC 540-1, may be: UPFs 550, SMFs 560, and AMFs 570. While instances of UPFs 550 and SMFs 560 may be executed in local zones 520, SMFs 560 may be executed across multiple local zones 520 for redundancy, processing load-balancing, and fail-over.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks. For example, executing instructions stored in the non-transitory computer-readable medium causes the processors to perform steps of methods and/or to implement features of components described herein.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method of communicating with a cellular network management system, comprising:

receiving, by a cellular network system, a first input via a graphical user interface (GUI), corresponding to a request for first cellular network data, the first input comprising a first cellular network identifier mapped to a user;

receiving, by the cellular network system, a selection of a cellular network management system from a plurality of cellular network management systems that are individually accessible via the GUI;

transmitting, by the cellular network system, the request for the first cellular network data to the selected cellular network management system via a first application programming interface (API), the first API selected from a plurality of APIs based on the selected cellular network management system;

receiving, by the cellular network system and from the selected cellular network management system via the first API, the first cellular network data comprising a second cellular network identifier mapped to the user;

storing, by the cellular network system, the first cellular network data, the first cellular network identifier, and the second cellular network identifier;

causing, by the cellular network system, a first view of the first cellular network data and a graphical element associated with the first cellular network data to be displayed, wherein the graphical element associated with the first cellular network data is configured to cause the cellular network system to display a second view of the first cellular network data;

causing, by the cellular network system, a context view representing a context of the request to be displayed within the GUI, the context view comprising the first cellular network identifier and the second cellular network identifier, and the context of the request to be used in subsequent requests;

receiving, by the cellular network system, a selection of a second cellular network management system from the plurality of cellular network management systems that are individually accessible via the GUI;

transmitting, by the cellular network system, a second request for second cellular network data to the second selected cellular network management system via a second API, the second request based on at least one of the first cellular network identifier and the second cellular network identifier, the second API selected from the plurality of APIs based on the second selected cellular network management system;

receiving, by the cellular network system and from the cellular network management system via the second API, the second cellular network data comprising a third cellular network identifier mapped to the user;

storing, by the cellular network system, the second cellular network data and the third cellular network identifier;

causing, by the cellular network system, a first view of the second cellular network data and a graphical element associated with the second cellular network data to be displayed, wherein the graphical element associated with the second cellular network data is configured to cause the cellular network system to display a second view of the second cellular network data; and updating, by the cellular network system and in the GUI, the context view to comprise the third cellular network identifier.

2. The method of claim 1, wherein the cellular network system causes the first cellular network identifier to be displayed in the context view in response to the first input and updates the context view to include the second cellular network identifier based on the first cellular network data.

3. The method of claim 1, wherein the first API queries a database containing cellular network data indicating one or more user devices associated with the user.

4. The method of claim 1, wherein the first API accesses a historical database comprising cellular network data relating to one or more transactions associated with the user.

5. The method of claim 1, wherein the first API accesses a database comprising cellular network information indicating one or more events associated with the user.

6. The method of claim 1, wherein the first API accesses one or more account identifiers associated with the user.

7. The method of claim 1, wherein the first API accesses cellular network billing information associated with the user.

8. A system for retrieving data from a cellular network management system, comprising:

one or more processors; and a non-transitory computer-readable medium comprising instructions that, when executed by the one or more processors, cause the system to perform operations to:

receive a first input via a graphical user interface (GUI), corresponding to a request for first cellular network data, the first input comprising a first cellular network identifier mapped to a user;

receive a selection of a cellular network management system from a plurality of cellular network management systems that are individually accessible via the GUI;

transmit the request for the first cellular network data to the selected cellular network management system via a first application programming interface (API), the first API selected from a plurality of APIs based on the selected cellular network management system;

receive, from the selected cellular network management system via the first API, the first cellular network data comprising a second cellular network identifier mapped to the user;

store the first cellular network data, the first cellular network identifier, and the second cellular network identifier;

cause a first view of the first cellular network data and a graphical element associated with the first cellular network data to be displayed, wherein the graphical element associated with the first cellular network data is configured to cause the cellular network system to display a second view of the first cellular network data; and cause a context view representing a context of the request to be displayed within the GUI, the context view comprising the first cellular network identifier and the second cellular network identifier, and the context of the request to be used in subsequent requests;

receive a selection of a second cellular network management system from the plurality of cellular network management systems that are individually accessible via the GUI;

transmit a second request for second cellular network data to the second selected cellular network management system via a second API, the second request based on at least one of the first cellular network identifier and the second cellular network identifier, the second API selected from the plurality of APIs based on the second selected cellular network management system;

receive, from the cellular network management application via the second API, the second cellular network data comprising a third cellular network identifier mapped to the user;

store the second cellular network data and the third cellular network identifier;

cause a first view of the second cellular network data and a graphical element associated with the second cellular network data to be displayed, wherein the graphical element associated with the second cellular network data is configured to cause the cellular network system to display a second view of the second cellular network data; and update, in the GUI, the context view to comprise the third cellular network identifier.

9. The system of claim 8, wherein the first API and the selected cellular network management system is a component of a wireless network provider.

10. The system of claim 9, wherein the wireless network provider is a 5G cellular network provider.

11. The system of claim 8, wherein the first API and the selected cellular network management system is associated with a third party.

12. The system of claim 8, wherein the system causes the first cellular network identifier to be displayed in the context view in response to the first input and updates the context view to include the second cellular network identifier based on the first cellular network data.

13. The system of claim 8, wherein the graphical element associated with the first cellular network data causes the system to access and display the cellular network data received from the respective application programming interface in an application outside of the GUI.

14. A non-transitory computer-readable medium comprising instructions that, when executed by one or more processors, cause the one or more processors to perform operations comprising:

receiving, by a cellular network system, a first input via a graphical user interface (GUI), corresponding to a request for first cellular network data, the first input comprising a first cellular network identifier mapped to a user;

receiving, by the cellular network system, a selection of a cellular network management system from a plurality of cellular network management systems that are individually accessible via the GUI;

transmitting, by the cellular network system, the request for the first cellular network data to the selected cellular network management system via a first application programming interface (API), the first API selected from a plurality of APIs based on the selected cellular network management system;

receiving, by the cellular network system and from the selected cellular network management system via the first API, the first cellular network data comprising a second cellular network identifier mapped to the user;

storing, by the cellular network system, the first cellular network data, the first cellular network identifier, and the second cellular network identifier;

causing, by the cellular network system, a first view of the first cellular network data and a graphical element associated with the first cellular network data to be displayed, wherein the graphical element associated with the first cellular network data is configured to cause the cellular network system to display a second view of the first cellular network data; and causing, by the cellular network system, a context view representing a context of the request to be displayed within the GUI, the context view comprising the first cellular network identifier and the second cellular network identifier, and the context of the request to be used in subsequent requests;

receiving, by the cellular network system, a selection of a second cellular network management system from the plurality of cellular network management systems that are individually accessible via the GUI;

transmitting, by the cellular network system, a second request for second cellular network data to the second selected cellular network management system via a second API, the second request based on at least one of the first cellular network identifier and the second cellular network identifier, the second API selected from the plurality of APIs based on the second selected cellular network management system;

receiving, by the cellular network system and from the cellular network management application via the second API, the second cellular network data comprising a third cellular network identifier mapped to the user;

storing, by the cellular network system, the second cellular network data and the third cellular network identifier;

causing, by the cellular network system, a first view of the second cellular network data and a graphical element associated with the second cellular network data to be displayed, wherein the graphical element associated with the second cellular network data is configured to cause the cellular network system to display a second view of the second cellular network data; and updating, by the cellular network system and in the GUI, the context view to comprise the third cellular network identifier.

15. The non-transitory computer-readable medium of claim 14, wherein a third display window comprises an error message associated with a failed API call.

16. The non-transitory computer-readable medium of claim 14, wherein the first API and the selected cellular network management system is a component of a wireless network provider.

17. The non-transitory computer-readable medium of claim 14, wherein the first API and the selected cellular network management system is associated with a third party.

* * * * *